United States Patent
Oh et al.

(10) Patent No.: US 9,325,261 B2
(45) Date of Patent: Apr. 26, 2016

(54) MOTOR DRIVING METHOD AND OPERATING METHOD THEREOF

(71) Applicant: Electronics and Telecommunications Research Institute, Daejeon (KR)

(72) Inventors: Jimin Oh, Daejeon (KR); Minki Kim, Daejeon (KR); Jung Hee Suk, Daejeon (KR); Sewan Heo, Daejeon (KR); Yil Suk Yang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 98 days.

(21) Appl. No.: 14/201,163

(22) Filed: Mar. 7, 2014

(65) Prior Publication Data

US 2015/0084556 A1    Mar. 26, 2015

(30) Foreign Application Priority Data

Sep. 24, 2013   (KR) .......................... 10-2013-0113400

(51) Int. Cl.
- H02P 27/04   (2006.01)
- H02P 6/16    (2006.01)
- H02P 6/06    (2006.01)
- H02P 6/08    (2006.01)
- H02P 6/14    (2006.01)

(52) U.S. Cl.
CPC . *H02P 6/08* (2013.01); *H02P 6/142* (2013.01)

(58) Field of Classification Search
USPC ............................ 318/400.08, 400.14, 400.35
See application file for complete search history.

(56) References Cited

U.S. PATENT DOCUMENTS

| | | | | |
|---|---|---|---|---|
| 7,109,672 B1* | 9/2006 | Mushika | ................ | G11B 19/04 318/139 |
| 2005/0248306 A1* | 11/2005 | Chen et al. | ..................... | 318/712 |
| 2010/0097021 A1* | 4/2010 | Kiyamura | ................ | 318/400.14 |
| 2011/0074327 A1* | 3/2011 | Paintz | ..................... | H02P 6/182 318/400.35 |

OTHER PUBLICATIONS

Motoshi Matsushita et al., "Sine-Wave Drive for PM Motor Controlling Phase Difference Between Voltage and Current by Detecting Inverter Bus Current", IEEE Transactions on Industry Applications, vol. 45, No. 4, Jul./Aug. 2009.

Shinji Shinnaka , "A New Power-Factor-Based Vector Control Method for Sensorless Drive of Permanent-Magnet Synchronous Motors", IEEJ Trans. IA, vol. 130, No. 2, pp. 215-217, 2010.

* cited by examiner

*Primary Examiner* — Eduardo Colon Santana
*Assistant Examiner* — Cortez Cook
(74) *Attorney, Agent, or Firm* — Rabin & Berdo, P.C.

(57) ABSTRACT

Provided is a motor driving circuit which transmits a driving signal to a motor, including a gate driver generating the driving signal corresponding to a pulse width modulation signal, a pulse width modulation signal generator generating the pulse width modulation signal according to Hall sensor signals received from Hall sensors mounted in the motor, a current sensor measuring a link current provided to the gate driver, a low pass filter outputting a filter current that high frequency components are removed from the measured link current, and a minimum power consumption estimating unit generating a lead angle according to a start signal with reference to the filter current, wherein the pulse with modulating signal is changed according to the lead angle.

20 Claims, 7 Drawing Sheets

MOTOR DRIVING METHOD AND OPERATING METHOD THEREOF

CROSS-REFERENCE TO RELATED APPLICATIONS

This U.S. non-provisional patent application claims priority under 35 U.S.C. §119 of Korean Patent Application No. 10-2013-0113400, filed on Sep. 24, 2013, the entire contents of which are hereby incorporated by reference.

BACKGROUND OF THE INVENTION

The present invention disclosed herein relates to a motor, and more particularly to a motor driving circuit estimating minimum power consumption and an operation method thereof.

Motors are apparatuses for converting electrical energy into mechanical energy by using a force received by a current in a magnetic field. The motors are classified into ac motors and dc motors according to a type of input power source. An ac motor rotates a rotor by providing a constant current to stator windings to change a magnetic field. A dc motor rotates a rotor by providing a constant current to the rotator. At this time, the dc motor allows a current to flow in a certain direction regardless of a position of the rotator by using a brush. Recently, as power electronic control technologies are developed, brushless direct current (BLDC) motors are provided which do not use the brush by using an electronic switching technology. Since the BLDC motors do not use brushes, there are no concerns about heat generation and abrasion of the brushes due to mechanical frictions.

It is necessary for a motor to extract a position signal of a rotor to maintain constant performance according to driving conditions. Here, the driving conditions include a driving speed, and load conditions. When the driving conditions are determined, a driving circuit of a motor provides energy to the motor according to the driving conditions. Under the same driving conditions, the most efficient way for driving a motor is to use minimum power consumption.

SUMMARY OF THE INVENTION

The present invention provides a driving circuit of a motor, which estimates minimum power consumption of the motor by measuring a dc current provided to the driving circuit, and a driving method thereof.

Embodiments of the present invention provide motor driving circuits which transmit a driving signal to a motor, including: a gate driver generating the driving signal corresponding to a pulse width modulation signal; a pulse width modulation signal generator generating the pulse width modulation signal according to Hall sensor signals received from Hall sensors mounted in the motor; a current sensor measuring a link current provided to the gate driver; a low pass filter outputting a filter current that high frequency components are removed from the measured link current; and a minimum power consumption estimating unit generating a lead angle according to a start signal with reference to the filter current, wherein the pulse with modulating signal is changed according to the lead angle.

In some embodiments, the pulse width modulation signal generator may include: a position estimating unit generating rotor position information according to the Hall sensor signals; a sinusoidal wave generating unit generating a sinusoidal signal according to the rotor position information; and a pulse width modulating unit generating the pulse width modulation signal according to the sinusoidal signal.

In other embodiments, the pulse width modulation signal generator may include a speed estimation and control unit estimating a rotor speed according to the rotor position information, receiving a reference speed signal to compare the estimated rotor speed with the reference speed signal, and generating a speed control signal according to a comparison result, wherein the pulse width modulating unit changes the pulse width modulating signal according to the speed control signal.

In still other embodiments, the position estimating unit may change the rotor position information according to the lead angle.

In even other embodiments, when the start signal is logic 0, the minimum power consumption estimating unit may output a pre-stored lead angle. When the start signal is logic 1, the minimum power consumption estimating unit may change the lead angle according to a preset lead angle change amount.

In yet other embodiments, when the filter current decreases according to an increase of the lead angle, the minimum power consumption estimating unit may increase the lead angle by the lead angle change amount and outputs the increased lead angle. When the filter current increases according to an increase of the lead angle, the minimum power consumption estimating unit may decrease the lead angle by the lead angle change amount and outputs the decreased lead angle.

In further embodiments, the minimum power consumption estimating unit may store a first filter current value corresponding to a first lead angle, and receive a second filter current corresponding to a second lead angle, which is changed from the first lead angle, to output the first or second lead angle according to a difference between the first filter current value and a second filter current value.

In still further embodiments, when a value obtained by subtracting the first filter current value from the second filter current value is smaller than a reference current value, the minimum power consumption estimating unit may output the second lead angle. When a value obtained by subtracting the first filter current value from the second filter current value is greater than or equal to a reference current value, the minimum power consumption estimating unit may output the first lead angle.

In other embodiments of the present invention, methods of operating a motor driving circuit, include: measuring a link current provided to a gate driver; removing high frequency components from the link current and converting the high frequency components-removed link current into a filter current; generating a lead angle through a minimum power consumption estimating process with reference to the filter current according to a start signal; generating a pulse width modulation signal according to the lead angle; and generating, by the gate driver, a motor driving signal according to the pulse width modulation signal.

In some embodiments, the generating of the lead angle may include: receiving a first filter current corresponding to a first lead angle; receiving a second filter current corresponding to a second lead angle which is changed from the first lead angle; and outputting the first or second lead angle according to a difference between the first and second filter current values.

In other embodiments, in the outputting of the first or second lead angle, the second lead angle may be output in a case where a value obtained by subtracting the first filter current value from the second filter current value is smaller than a preset reference current value.

In still other embodiments, in the outputting of the first or second lead angle, the first lead angle may be output in a case where a value obtained by subtracting the first filter current value from the second filter current value is greater than or equal to a preset reference current value.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
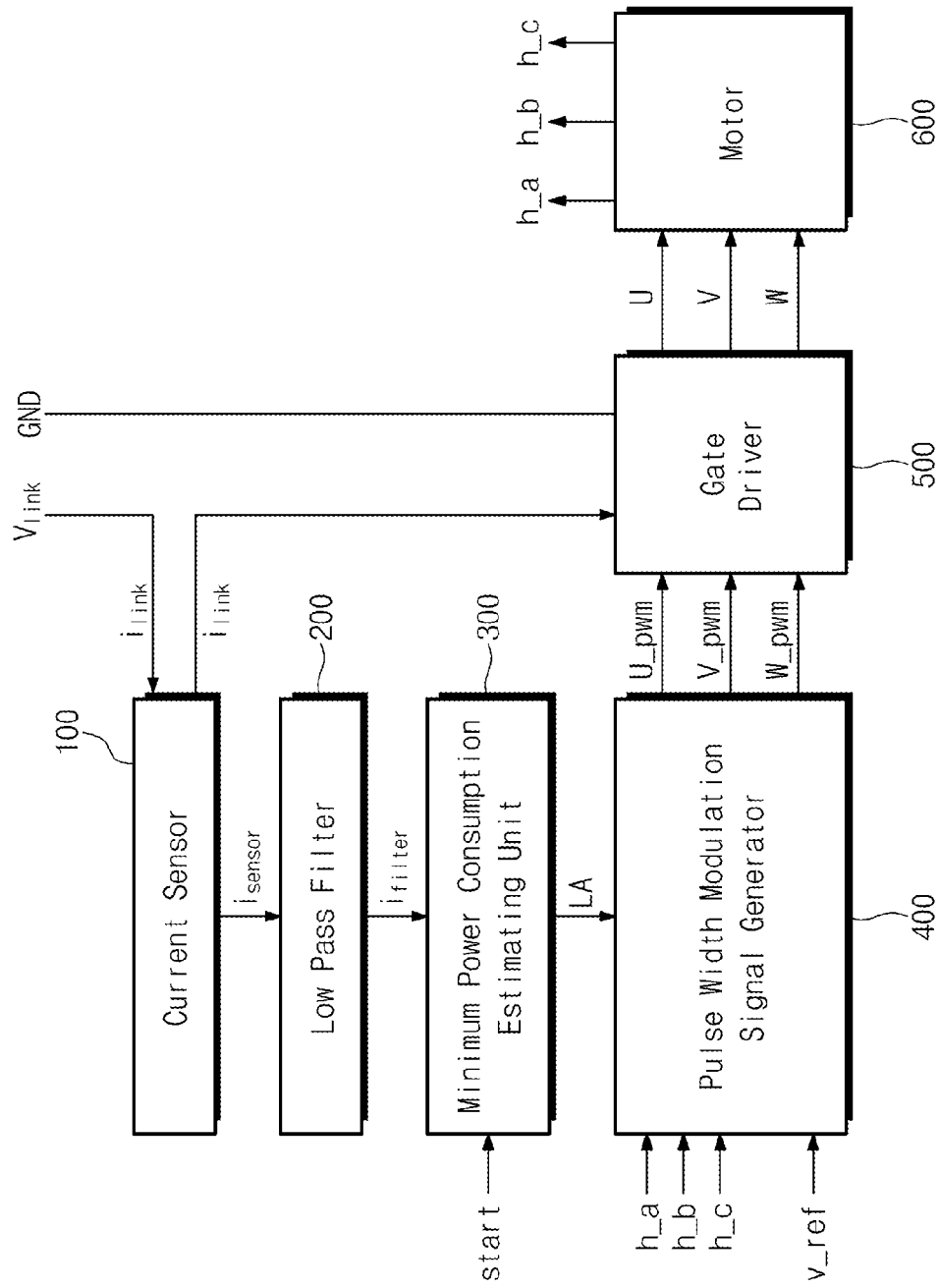
FIG. 1 is a block diagram illustrating a driving circuit of a motor according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

It should be construed that foregoing general illustrations and following detailed descriptions are exemplified and an additional explanation of claimed inventions is provided. Reference numerals are indicated in detail in embodiments of the present invention, and their examples are represented in reference drawings. In every possible case, like reference numerals are used for referring to the same or similar elements in the description and drawings.

Below, a motor is used as one example of an electrical device for illustrating characteristics and functions of example embodiments. However, those skilled in the art can easily understand other advantages and performances of example embodiments according to the descriptions. Moreover, example embodiments may be implemented or applied through other embodiments. Besides, the detailed description may be amended or modified according to viewpoints and applications, not being out of the scope, technical idea and other objects of example embodiments.

Hereinafter, it will be described about an exemplary embodiment of the present invention in conjunction with the accompanying drawings.

FIG. 1 is a block diagram illustrating a driving circuit of a motor according to an embodiment of the present invention.

Referring to FIG. 1, a motor 600 may receive motor driving signals U, V, and W from a gate driver 500 to be driven. In FIG. 1, a brushless direct current (BLDC) motor is exemplified. However, those skilled in art can easily understand that the motor is not limited to thereto.

A current sensor 100 may measure a link current $i_{link}$ provided to the gate driver 500. The current sensor 100 may measure a current flowing on a conduction line by using a magnetic field around the conduction line. The current sensor 100 may measure the link current $i_{link}$ to transmit a sensor current $i_{sensor}$ to a low pass filter 200. The link current $i_{link}$ may be provided to the gate driver 500 through the current sensor 100.

The low pass filter 200 may remove a high frequency component of the measured sensor current $i_{sensor}$. A cut-off frequency of the low pass filter 200 may be set lower than those of pulse width modulation signals U_pwm, V_pwm, and W_pwm. Although the link current $i_{link}$ and the sensor current $i_{sensor}$ are typically dc currents, they may include high frequency components. The low pass filter 200 may transmit a filter current $i_{filter}$ that high frequency components are removed from the sensor current $i_{sensor}$ to a minimum power consumption estimating unit 300.

The minimum power consumption estimating unit 300 may control power consumption of the motor 600 by using a relationship between the filter current $i_{filter}$ and the lead angle LA. The relationship between the filter current $i_{filter}$ and the lead angle LA will be described in relation to FIGS. 4 and 5 later. The lead angle LA is a value for changing a position of the rotor of the motor 600. The lead angle LA will be described in relation to FIG. 3. The unit of the lead angle LA may be a degree (for example, 0 to 360°). The minimum power consumption estimating unit 300 may receive a start signal 'start'. The start signal 'start' may be, for example, logic 0 or logic 1. When the start signal 'start' is logic 0, the minimum power consumption estimating unit 300 may output a preset lead angle LA. When the start signal 'start' is logic 1, the minimum power consumption estimating unit 300 may output the changed lead angle LA by using the relationship between the filter current $i_{filter}$ and the lead angle LA.

The pulse width modulation signal generator 400 may transmit pulse width modulation signals U_pwm, V_pwm, and W_pwm to the gate driver 500. The pulse width modulation signal generator 400 may estimate a position of the rotor by receiving Hall sensor signals h_a, h_b, and h_c from a Hall sensor (not shown) mounted in the motor 600. The pulse width modulation signal generator 400 may generate the pulse width modulation signals U_pwm, V_pwm, and W_pwm by using the estimated rotor position information 'angle'.

Moreover, the pulse width modulation signal generator 400 may receive a reference speed signal v_ref. The pulse width modulation signal generator 400 may estimate a speed of the rotor by using the rotor position information 'angle'. The speed of the rotor may be estimated through a change of the rotor position information 'angle' according to time. The pulse width modulation signal generator 400 may compare the speed of the estimated rotor speed with the reference speed to control the pulse width modulation signals U_pwm, V_pwm, and W_pwm.

In addition, the pulse width modulation signal generator 400 may receive the lead angle LA from the minimum power consumption estimating unit 300. The pulse width modulation signal generator 400 may change the rotor position information 'angle' by using the lead angle LA. The pulse width modulation signal generator 400 may generate the pulse width modulation signals U_pwm, V_pwm, and W_pwm according to the changed rotor position information 'angle'.

The gate driver 500 may receive the pulse width modulation signals U_pwm, V_pwm, and W_pwm to change them to the motor driving signals U, V, and W. The gate driver 500 may be connected to a link voltage $V_{link}$ and a ground voltage GND. For example, the pulse width modulation signals U_pwm, V_pwm, and W_pwm may have lower voltages than the motor driving signals U, V, and W. The gate drivers 500 may receive the link current $i_{link}$ to generate the motor driving signals U, V, and W. The link current $i_{link}$ may include a current provided to the motor 600 and a current used to generate the motor driving signals U, V, and W. However, the current provided to the motor 600 may occupy most of the link current $i_{link}$.

The motor 600 may receive the motor driving signals U, V, and W from the gate driver 500. The Hall sensor mounted in the motor 600 may generate the Hall sensor signals h_a, h_b, and h_c.

The motor driving signals U, V, and W may be, for example, ac signals. Accordingly, it may be imprecise to measure power consumption of the motor 600 by measuring the motor driving signals U, V, and W. It may be also imprecise to control the power consumption of the motor 600 by measuring the motor driving signals U, V, and W. Accordingly, the current sensor 100 according to an embodiment of the present invention measures the link current $i_{link}$ provided to the gate driver 500. The minimum power consumption estimating unit 300 may control the power consumption of the motor 600 under the same driving conditions (for example, the rotor speed) by using the filter current $i_{filter}$ that high frequency components are removed from the measured link current $i_{link}$.

Figure 2:
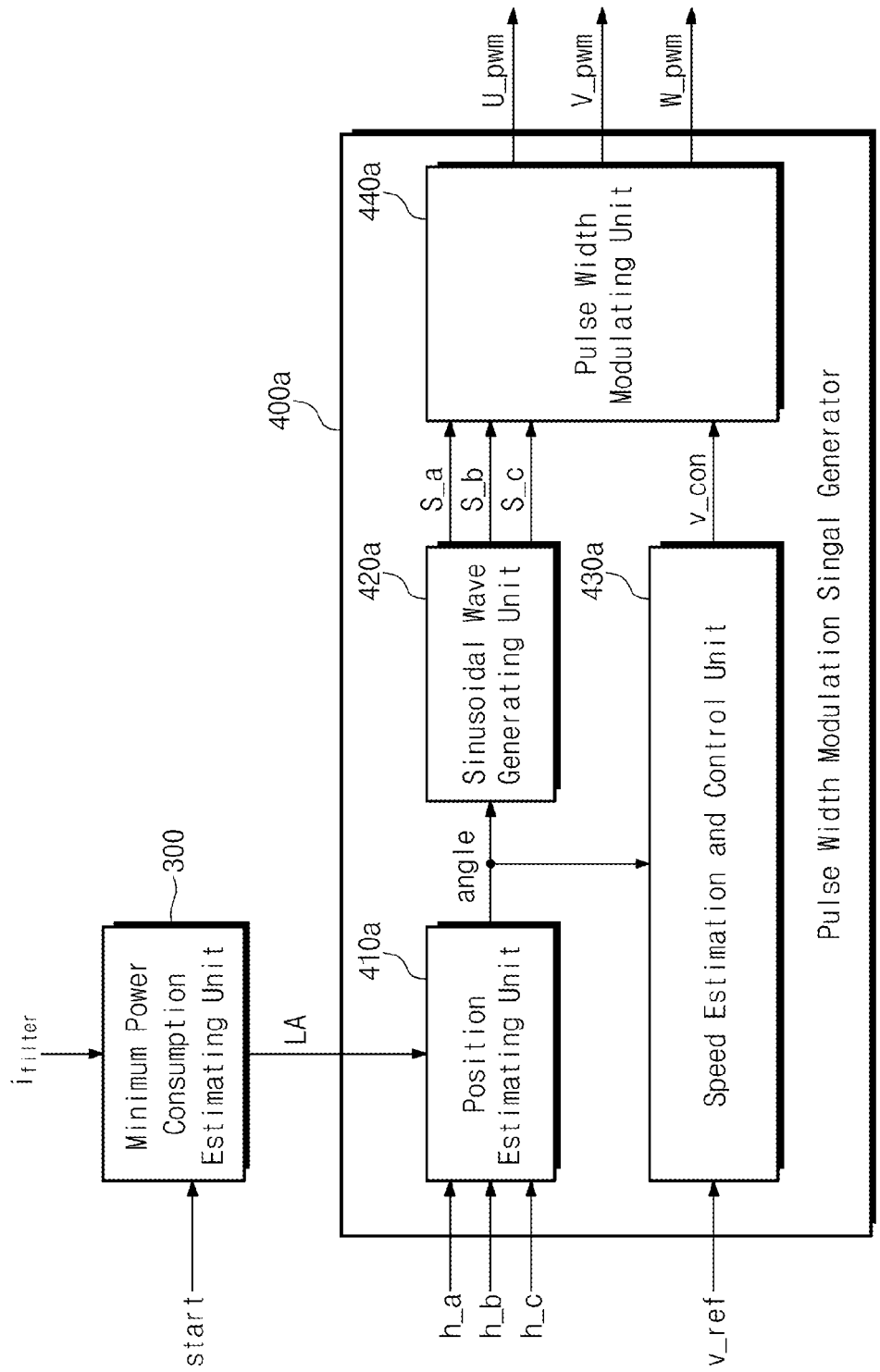
FIG. 2 is a block diagram illustrating in detail the pulse width modulation signal generator of FIG. 1.

FIG. 2 is a block diagram illustrating in detail the pulse width modulation signal generator of FIG. 1. Referring to FIG. 2, the pulse width modulation signal generator 400a may receive the lead angle LA from the minimum power consumption estimating unit 300 to generate the pulse width modulation signals U_pwm, V_pwm, and W_pwm. The pulse width modulation signal generator 400a may include a position estimating unit 410a, a sinusoidal wave generating unit 420a, a speed estimation and control unit 430a, and a pulse width modulating unit 440a.

The minimum power consumption estimating unit 300 may transmit a preset lead angle LA to the position estimating unit 410a. The minimum power consumption estimating unit 300 receives the filter current $i_{filter}$ and the start signal 'start' to change the lead angle. The lead angle LA is a value for changing the rotor position. The lead angle will be described in relation to FIG. 3. The lead angle LA may be transmitted to the position estimating unit 410a. The start signal 'start' may be, for example, logic 0 or logic 1. When the start signal 'start' is logic 0, the minimum power consumption estimating unit 300 may output the preset lead angle LA. When the start signal 'start' is logic 1, the minimum power consumption estimating unit 300 may output the changed lead angle LA by using the relationship between the filter current $i_{filter}$ and the lead angle LA. The relationship between the filter current $i_{filter}$ and the lead angle LA will be described in relation to FIGS. 4 and 5.

The position estimating unit 410a may receive the Hall sensor signals h_a, h_b, and h_c to estimate the rotor position. The position estimating unit 410a may estimate the rotor position on the basis of any one of the Hall sensor signals h_a, h_b, and h_c. The position estimating unit 410a may generate the estimated rotor position information 'angle'. For example, the rotor position information 'angle' may have a value of 0 to 360°. When the Hall sensor signal h_a increases to a high level, the position estimating unit 410a may generate the rotor position information 'angle' having a value of 0°. The rotor position information 'angle' may be transmitted to the sinusoidal wave generating unit 420a and the speed estimation and control unit 430a. Also, the position estimating unit 410a may change the rotor position information 'angle' according to the received lead angle LA.

The sinusoidal wave generating unit 420a may receive the rotor position information 'angle' to generate the sinusoidal signals S_a, S_b, and S_c. The sinusoidal wave generating unit 420a may store, for example, a look-up table according to the rotor position information 'angle'. The sinusoidal wave generating unit 420a may generate the sinusoidal signals S_a, S_b, and S_c corresponding to the received rotor position information 'angle' according to the look-up table. For example, the sinusoidal signal S_a may be generated as a reference signal according to the rotor position information 'angle'. The sinusoidal signal S_b may be generated to have 120° phase difference from the sinusoidal signal S_a. The sinusoidal signal S_c may be generated to have 240° phase difference from the sinusoidal signal S_a.

The pulse width modulating unit 440a may receive the sinusoidal signals S_a, S_b, and S_c to generate pulse width modulation signals U_pwm, V_pwm, and W_pwm. The pulse width modulation (PWM) is a scheme for changing analog physical quantities to digital quantities. The PWM may sample an analog signal in a constant period. The PWM converts an analog signal into a digital signal having a pulse width which is proportional to a sampled value. The pulse width modulating unit 440a performs the PWM to generate the pulse width modulation signals U_pwm, V_pwm, and W_pwm corresponding to the received sinusoidal signals S_a, S_b, and S_c.

Furthermore, the pulse width modulating unit 440a may receive a speed control signal v_con from the speed estimation and control unit 430a. The pulse width modulating unit 440a may control pulse widths of the pulse width modulation signals U_pwm, V_pwm, and W_pwm according to the speed control signal v_con. For example, when the pulse widths of the pulse width modulation signals U_pwm, V_pwm, and W_pwm increase, the rotor speed of the motor 600 may increase.

The speed estimation and control unit 430a may receive rotor position information 'angle' to estimate the rotor speed. The rotor speed may be estimated through a change of the rotor position information 'angle' according to time. The speed estimation and control unit 430a may receive the reference speed signal v_ref. The speed estimation and control unit 430a may compare the estimated rotor speed and with the reference speed signal v_ref to generate speed control signal v_con. For example, when the estimated rotor speed is faster than the reference speed, the speed estimation and control unit 430a may generate the speed control signal v_con to decrease the rotor speed. When the estimated rotor speed is slower than the reference speed, the speed estimation and control unit 430a may generate the speed control signal v_con to increase the rotor speed.

As described above, the minimum power consumption estimating unit 300 may transmit the lead angle LA to the position estimating unit 410a. The position estimating unit 410a may change the estimated rotor position information 'angle' according to the received lead angle LA. The pulse width modulation signals U_pwm, V_pwm, W_pwm may be generated according to the changed rotor position information 'angle'. When the pulse width modulation signals U_pwm, V_pwm, and W_pwm are changed, the rotor position may be also changed. That is, the rotor position may be changed according to the leas angle LA. The power consumption of the motor 600 may be differed according to the rotor position under the same driving conditions. Accordingly, the minimum power consumption estimating unit 300 may control the power consumption of the motor 600 by changing the lead angle LA.

Figure 3:
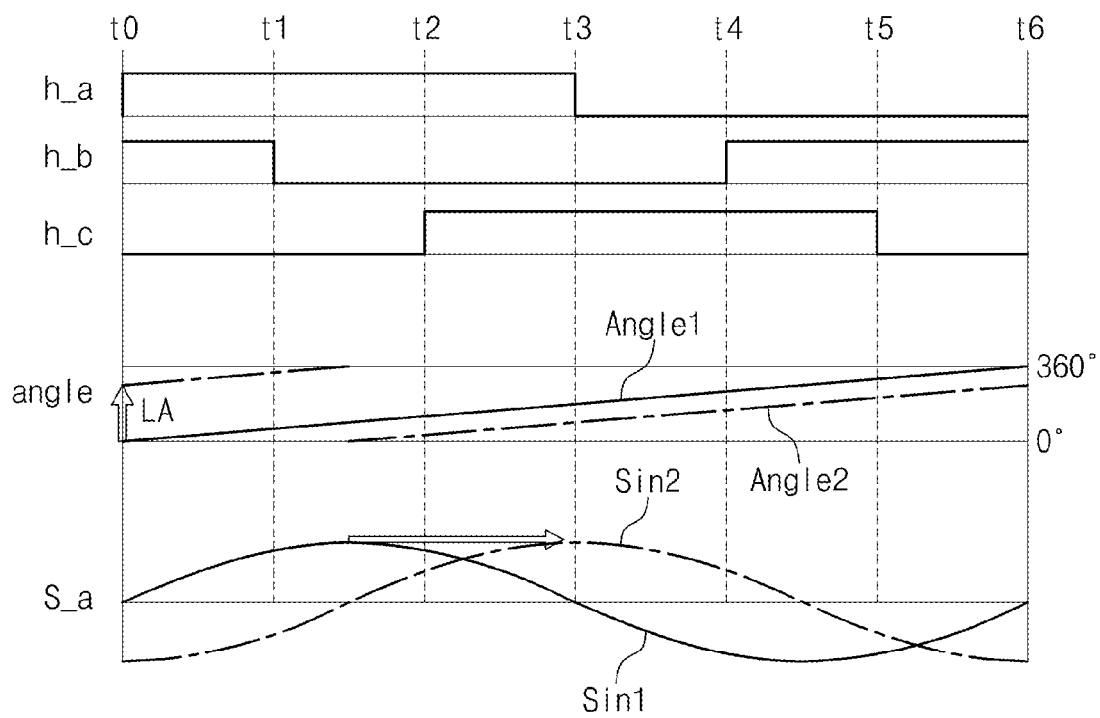
FIG. 3 is a timing diagram illustrating meaning of a lead angle in the motor driving circuit of FIG. 1.

FIG. 3 is a timing diagram illustrating meaning of the lead angle in the motor driving circuit of FIG. 1. Referring to FIGS. 1 to 3, the Hall sensor signals h_a, h_b, and h_c may be generated by the Hall sensors mounted in the motor 600. The Hall sensors may generate signals which are changed according to applied magnetic field. Accordingly, the Hall sensors may generate signals which are changed according to the rotor position. For example, the Hall sensor signals h_a, h_b, and h_c may be pulse type signals which are repetitive in a constant period. The Hall sensor signal h_a may be a pulse type signal rising at time t0 and falling at time t3. The Hall sensor signal h_b may be a pulse type signal falling at time t1 and rising at time t4. The Hall sensor signal h_c may be a pulse type signal rising at time t2 and falling at time t5.

The position estimating unit 410a may receive the Hall sensor signals h_a, h_b, and h_c to generate the rotor position information 'angle'. For example, the rotor position information 'angle' may have a value of 0 to 360°. Accordingly, when the Hall sensor signal h_a rises at time t0, the position estimating unit 410a may generate first position information Angle1. The sinusoidal wave generating unit 420a may receive the first rotor position information Angle1 to generate a first sinusoidal signal Sin1. The speed estimation and control unit 430a may receive the first rotor position information Angle1 to estimate the rotor speed. A slope of the first rotor position information Angle1 may represent the rotor speed.

The minimum power consumption estimating unit 300 may transmit the lead angle LA to the position estimating unit 410a. For example, the lead angel LA may have a value of 0 to 360°. The position estimating unit 410a may change the first rotor position information Angle1 to second rotor position information Angle2. The sinusoidal wave generating unit 420a may generate a second sinusoidal signal Sin2 according to the second rotor position information Angle2. Accordingly, the first sinusoidal signal Sin1 may be changed to the second sinusoidal signal Sin2 according to the lead angle LA. However, the rotor speed is not changed at this time. This is because slopes of the first and second rotor position information Angle1 and Angle2 are the same.

Accordingly, the rotor position information 'angle' may be changed according to the lead angle LA. When the rotor position information 'angle' is changed, the pulse width modulation signals U_pwm, V_pwm, and W_pwm may be changed, When the pulse width modulation signals U_pwm, V_pwm, and W_pwm are changed, the power consumption of the motor 600 may be differed according to the changed rotor position. However, the rotor speed is not changed by the lead angle LA. This is because the lead angle LA does not change the slope of the rotor position information 'angle'.

Figure 4:
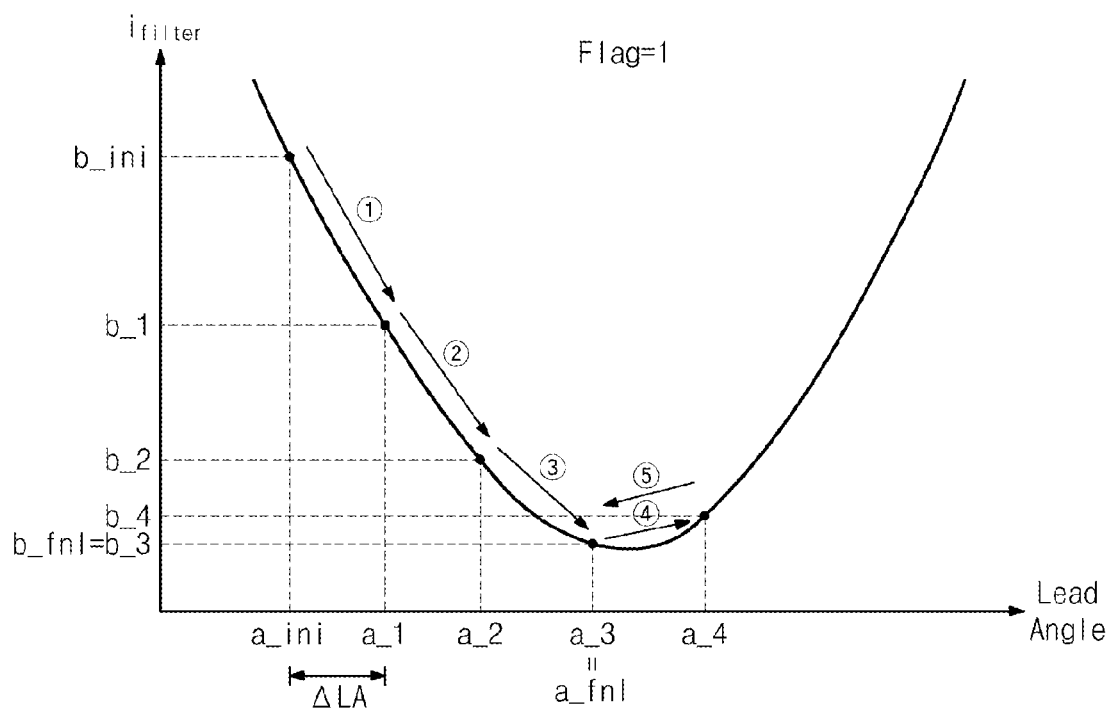
FIG. 4 illustrates an embodiment of a method of estimating a minimum consumption current of the motor driving circuit of FIG. 1.

FIG. 4 illustrates an embodiment of a method of estimating a minimum consumption current of the motor driving circuit of FIG. 1. Referring to FIGS. 1 to 4, the relationship between the filter current $i_{filter}$ and the lead angle LA may be represented as a parabola as shown in FIG. 4. Ordered pairs of the filter current $i_{filter}$ and the lead angle LA may move along the parabola of FIG. 4. The minimum power consumption estimating unit 300 may set an initial lead angle a_ini. The minimum power consumption estimating unit 300 may receive an initial filter current b_ini according to the initial lead angle a_ini. The minimum power consumption estimating unit 300 may add or subtract a preset lead angle change amount Δ LA to or from a current lead angle LA.

The minimum power consumption estimating unit 300 may firstly set a flag. For example, when the lead angle LA is increased and the filter current $i_{filter}$ is decreased, the flag may be set to logic 1. When the lead angle LA is increased and the filter current $i_{filter}$ is increased, the flag may be set to logic 0. FIG. 4 shows a case where the flag is logic 1.

The minimum power consumption estimating unit 300 may receive a start signal 'start'. For example, when the start signal 'start' is logic 0, the minimum power consumption estimating unit 300 may maintain a currently set lead angle LA. When the start signal 'start' is logic 1, the minimum power consumption estimating unit 300 may start a minimum power consumption estimating process.

When the minimum power consumption estimating process starts, the minimum power consumption estimating unit 300 may set the initial lead angle a_ini and the initial filter current b_ini and then add the lead angle change amount Δ LA to the initial lead angle a_ini. The minimum power consumption estimating unit 300 may store the initial filter current value b_ini. The minimum power consumption estimating unit 300 may output a first lead angle a_1 and correspondingly receive a first filter current b_1. The minimum power consumption estimating unit 300 may store a preset reference current difference Δ i. The minimum power consumption estimating unit 300 may compare a value obtained by subtracting the initial filter current b_ini from the first filter current b_1 and the reference current difference Δ i (process ①).

When the value obtained by subtracting the initial filter current b_ini from the first filter current b_1 is smaller than the reference current difference Δ i, the start signal 'start' may be kept as logic 1. The minimum power consumption estimating unit 300 may add the lead angle change amount Δ LA to the first lead angle a_1. The minimum power consumption estimating unit 300 may store the first filter current b_1. The minimum power consumption estimating unit 300 may output a second lead angle a_2 and correspondingly receive a second filter current b_2. The minimum power consumption estimating unit 300 may compare a value obtained by subtracting the first filter value b_1 from the second filter value b_2 and the current difference Δ i (process ②). When the value obtained by subtracting the first filter value b_1 from the second filter value b_2 is smaller than the reference current difference Δ i, the start signal 'start' may be kept as logic 1. The process ③ may be performed in the same manner as the process ②.

In process ④, the minimum power consumption estimating unit 300 may compare a value obtained by subtracting a third filter current b_3 from a fourth filter current b_4 and the reference current difference Δ i. When the value obtained by subtracting the third filter current b_3 from the fourth filter current b_4 is greater than the reference current difference Δ i, the minimum power consumption estimating unit 300 may subtract the lead angle change amount Δ LA from a current lead angle a_4 (operation ⑤). After the process ⑤, the start signal 'start' may be changed to logic 0. The minimum power consumption estimating unit 300 may finally output the third lead angle a_3=a_fnl. Accordingly, the motor 600 may be driven with the link current $i_{link}$ corresponding to the third filter current b_3=b_fnl. The motor 600 may be driven with the link current $i_{link}$ smaller than an initially provided current under the same driving conditions.

Figure 5:
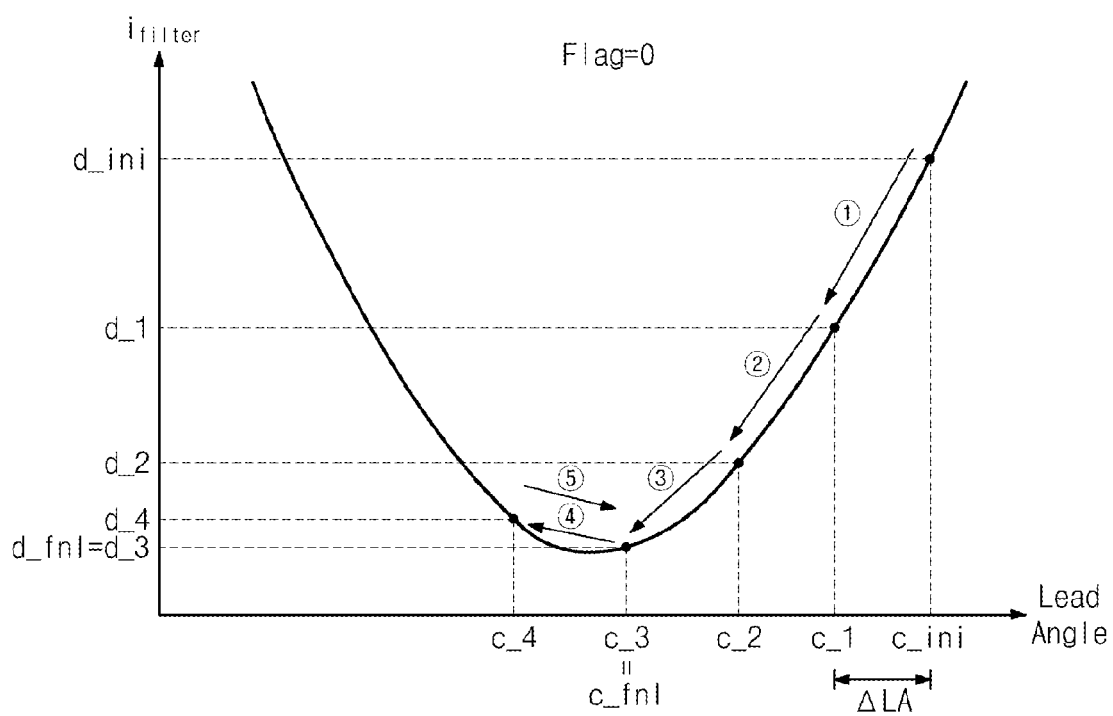
FIG. 5 illustrates another embodiment of a method of estimating a minimum consumption current of the motor driving circuit of FIG. 1.

FIG. 5 illustrates another embodiment of a method of estimating a minimum consumption current of the motor driving circuit of FIG. 1. Referring to FIGS. 1 to 3, and FIG. 5, the relationship between the filter current $i_{filter}$ and the lead angle LA may be represented as a parabola as shown in FIG. 5. Ordered pairs of the filter current $i_{filter}$ and the lead angle LA may move along the parabola of FIG. 5. The minimum power consumption estimating unit 300 may set an initial lead angle c_ini. The minimum power consumption estimating unit 300 may receive an initial filter current d_ini according to the initial lead angle c_ini. The minimum power consumption estimating unit 300 may add or subtract a preset lead angle change amount Δ LA to or from a current lead angle LA.

The minimum power consumption estimating unit 300 may firstly set a flag. For example, when the lead angle LA is increased and the filter current $i_{filter}$ is decreased, the flag may be set to logic 1. When the lead angle LA is increased and the filter current $i_{filter}$ is increased, the flag may be set to logic 0. FIG. 5 shows a case where the flag is logic 0.

The minimum power consumption estimating unit 300 may receive a start signal 'start'. For example, when the start signal 'start' is logic 0, the minimum power consumption estimating unit 300 may maintain a currently set lead angle LA. When the start signal 'start' is logic 1, the minimum power consumption estimating unit 300 may start a minimum power consumption estimating process.

When the minimum power consumption estimating process starts, the minimum power consumption estimating unit 300 may set the initial lead angle c_ini and the initial filter current d_ini and then subtract the lead angle change amount Δ LA from the initial lead angle c_ini. The minimum power consumption estimating unit 300 may store the initial filter current value d_ini. The minimum power consumption estimating unit 300 may output a first lead angle c_1 and correspondingly receive a first filter current d_1. The minimum power consumption estimating unit 300 may store a preset reference current difference Δ i. The minimum power consumption estimating unit 300 may compare a value obtained by subtracting the initial filter current d_ini from the first filter current d_1 and the reference current difference Δ i (process ①).

When the value obtained by subtracting the initial filter current d_ini from the first filter current d_1 is smaller than the reference current difference Δ i, the start signal 'start' may be kept as logic 1. The minimum power consumption estimating unit 300 may subtract the lead angle change amount Δ LA from the first lead angle c_1. The minimum power consumption estimating unit 300 may store the first filter current d_1. The minimum power consumption estimating unit 300 may output a second lead angle c_2 and correspondingly receive a second filter current d_2. The minimum power consumption estimating unit 300 may compare a value obtained by subtracting the first filter value d_1 from the second filter value d_2 and the current difference Δ i (process ②). When the value obtained by subtracting the first filter value d_1 from the second filter value d_2 is smaller than the reference current difference Δ i, the start signal 'start' may be kept as logic 1. The process ③ may be performed in the same manner as the process ②.

In process ④, the minimum power consumption estimating unit 300 may compare a value obtained by subtracting a third filter current d_3 from a fourth filter current d_4 and the reference current difference Δ i. When the value obtained by subtracting the third filter current d_3 from the fourth filter current d_4 is greater than the reference current difference Δ i, the minimum power consumption estimating unit 300 may add the lead angle change amount Δ LA to a current lead angle a_4 (operation ⑤). After the process ⑤, the start signal 'start' may be changed to logic 0. The minimum power consumption estimating unit 300 may finally output the third lead angle c_3=c_fnl. Accordingly, the motor 600 may be driven with the link current $i_{link}$ corresponding to the third filter current d_3=d_fnl. The motor 600 may be driven with the link current $i_{link}$ smaller than an initially provided current under the same driving conditions.

Figure 6:
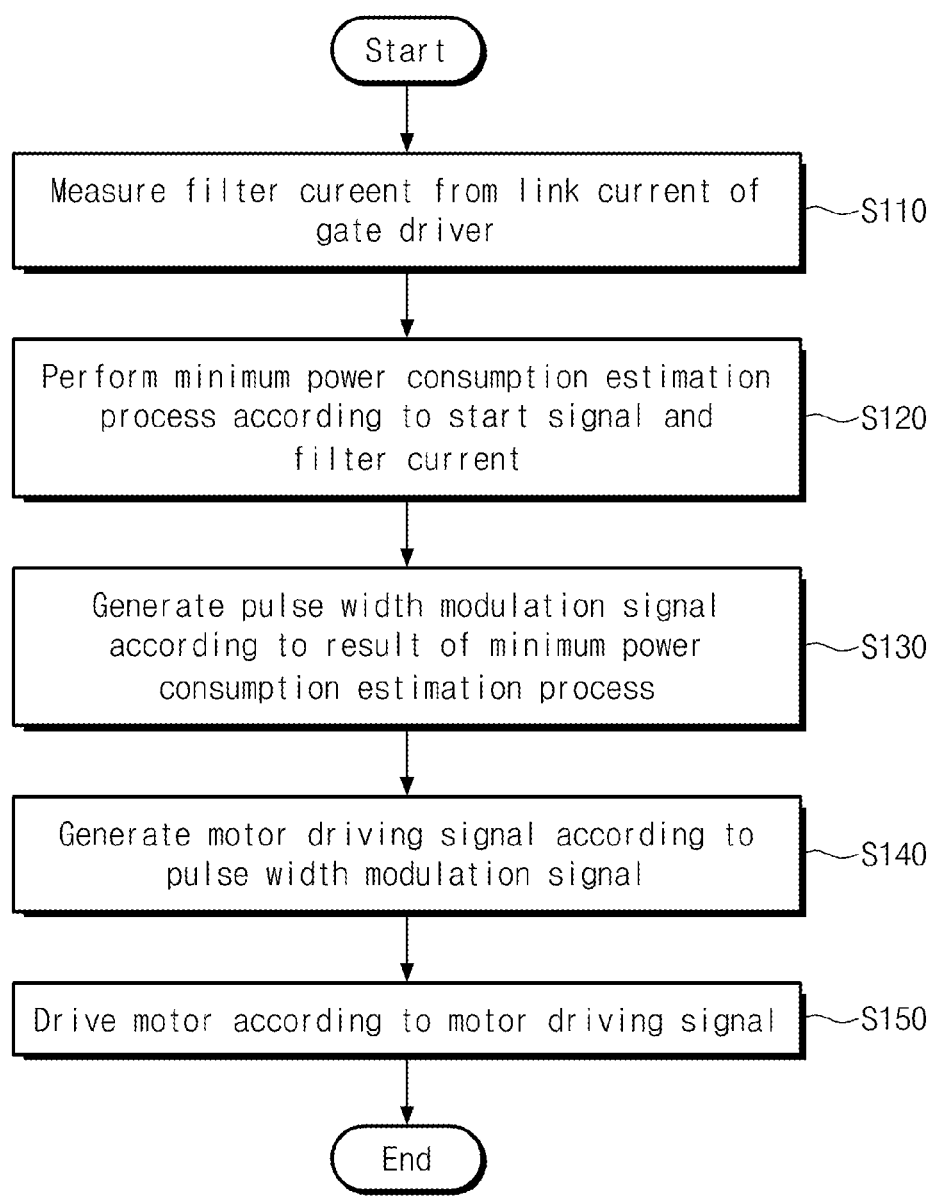
FIG. 6 is a flowchart illustrating a driving method of a motor according to an embodiment of the present invention.

FIG. 6 is a flowchart illustrating a driving method of a motor according to an embodiment of the present invention. Referring to FIGS. 1 and 6, the power consumption of the motor 600 may be controlled with the lead angle LA generated from the minimum power consumption estimating unit 300.

In operation S110, the current sensor 100 may measure the link current $i_{link}$. The current sensor 100 may output the sensor current $i_{sensor}$ measured by using a magnetic field due to the link current $i_{link}$ flowing on a conduction line. The link current $i_{link}$ may include high frequency components. Accordingly, the sensor current $i_{sensor}$ may include high frequency components. The low pass filter 200 may output a filter current $i_{filter}$ that high frequency components are removed from the sensor current $i_{sensor}$ in order to use it in the minimum power consumption estimating unit 300. The cut-off frequency of the low pass filter 200 may be set to be lower than those of the pulse width modulation signals U_pwm, V_pwm, and W_pwm.

In operation S120, the minimum power consumption estimating unit 300 may receive the start signal 'start' and the filter current $i_{filter}$ to perform the minimum power consumption estimating process (see FIGS. 4 and 5). The minimum power consumption estimating unit 300 may set the initial lead angle LA. The minimum power consumption estimating unit 300 may receive the initial filter current $i_{filter}$ corresponding to the initial lead angle LA.

The minimum power consumption estimating unit 300 may firstly set the flag. For example, when the lead angle LA is increased and the $i_{filter}$ is decreased, the flag may be set to logic 1. When the lead angle LA is increased and the filter current $i_{filter}$ is increased, the flag may be set to logic 0.

The minimum power consumption estimating unit 300 may maintain or change a current lead angle LA according to the start signal 'start'. The minimum power consumption estimating unit 300 may output the changed lead angle LA by using the relationship between the lead angle LA and the filter current $i_{filter}$. For example, when the start signal 'start' is logic 0, the minimum power consumption estimating unit 300 may maintain and output the current lead angle LA. When the start signal 'start' is logic 1, the minimum power consumption estimating unit 300 may change the lead angle LA and output the changed lead angle LA.

For example, when the start signal 'start' is logic 1 and the flag is logic 1, the minimum power consumption estimating unit 300 may add the lead angle change amount Δ LA to a current angle LA to set as a next lead angle LA. When the start signal 'start' is logic 1 and the flag is logic 0, the minimum power consumption estimating unit 300 may subtract the lead angle change amount Δ LA from a current lead angle LA to set as a next lead angle LA. The minimum power consumption estimating unit 300 may receive a next filter current $i_{filter}$ corresponding to the next lead angle LA. The minimum power consumption estimating unit 300 compares the current filter current $i_{filter}$ with the next filter current $i_{filter}$ to determine whether to perform the minimum power consumption estimating process. The minimum power consumption estimating process is described above in relation to FIGS. 4 and 5, and thus detailed description is omitted.

In operation S130, the minimum power consumption estimating unit 300 may transmit a finally determined lead angle LA to the pulse width modulation signal generator 400 according to a minimum power consumption estimating result. The pulse width modulation signal generator 400 may generate the pulse width modulation signals U_pwm, V_pwm, and W_pwm according to the received lead angle LA.

In operation S140, the gate driver 500 may generate the motor driving signals U, V, and W corresponding to the received pulse width modulation signals U_pwm, V_pwm, and W_pwm. For example, the pulse width modulation signals U_pwm, V_pwm, and W_pwm may have lower voltages than the motor driving signals U, V, and W. The gate driver 500 may generate the motor driving signals U, V, and W corresponding to the link voltage $V_{link}$.

In operation S150, the motor 600 may be driven according to the received motor driving signals U, V, and W. The motor 600 may be driven with the link current $i_{link}$ lower than an initially provided current through the minimum power consumption estimating process. Accordingly, the power consumption of the motor 600 may be reduced. However, the rotor speed of the motor 600 may not be changed. That is, the motor 600 may be driven with the link current $i_{link}$ lower than the initially provided current under the same driving conditions.

Figure 7:
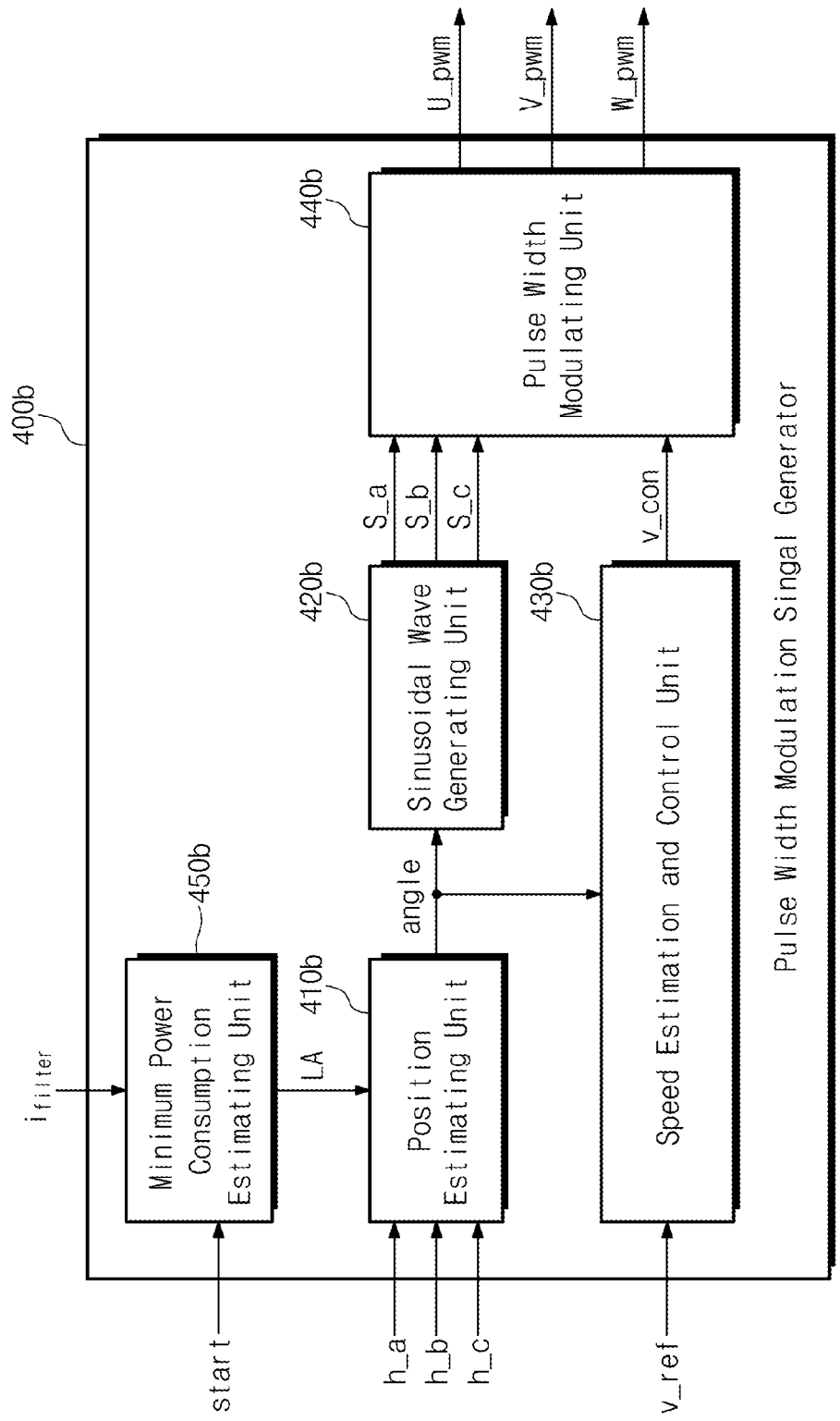
FIG. 7 is a block diagram illustrating a pulse width modulation signal generator according to another embodiment of the present invention.

FIG. 7 is a block diagram illustrating a pulse width modulation signal generator according to another embodiment of the present invention. Referring to FIG. 7, a minimum power consumption estimating unit 450b may be included inside a pulse width modulation signal generator 400b.

The minimum power consumption estimating unit 450b may transmit a preset lead angle LA to a position estimating unit 410b. The minimum power consumption estimating unit 450b may receive a filter current $i_{filter}$ and a start signal 'start' to change a lead angle LA. The lead angle LA is a value for changing a rotor position. The lead angle LA may be transmitted to the position estimating unit 410b.

The minimum power consumption estimating unit 450b may firstly set a flag. For example, when the lead angle LA is increased and the filter current $i_{filter}$ is decreased, the flag is set to logic 1. When the lead angle LA is increased and the filter current $i_{filter}$ is increased, the flag may be set to logic 0.

The minimum power consumption estimating unit 450b may maintain or change a current lead angle LA according to the start signal 'start'. The minimum power consumption estimating unit 450b may output the changed lead angle LA by using the relationship between the lead angle LA and the filter current $i_{filter}$. For example, when the start signal is logic 0, the minimum power consumption estimating unit 450b may maintain and output the current lead angle LA. When the start signal 'start' is logic 1, the minimum power consumption estimating unit 450b may change the lead angle LA and output the changed lead angle LA.

For example, when the start signal 'start' is logic 1 and the flag is logic 1, the minimum power consumption estimating unit 450b may add the lead angle change amount Δ LA to the current lead angle LA to set as a next lead angle LA. When the start signal 'start' is logic 1 and the flag is logic 0, the minimum power consumption estimating unit 450b may subtract the lead angle change amount Δ LA from a current lead angle LA to set as a next lead angle LA. The minimum power consumption estimating unit 450b may receive a next filter current $i_{filter}$ corresponding to the next lead angle LA. The minimum power consumption estimating unit 450b compares the current filter current $i_{filter}$ with the next filter current $i_{filter}$ to determine whether to perform the minimum power consumption estimating process. The minimum power consumption estimating process is described above in relation to FIGS. 4 and 5, and thus detailed description is omitted.

The position estimating unit 401b may receive Hall sensor signals h_a, h_b, and h_c to estimate a rotor position. The position estimating unit 410b may estimate the rotor position on the basis of any one of the Hall sensor signals h_a, h_b, and h_c. The position estimating unit 410b may generate the rotor position information 'angle'. For example, the rotor position information 'angle' may have a value of 0 to 360°. The rotor position information 'angle' may be transmitted to the sinusoidal wave generating unit 420b and the speed estimation and control unit 430b. Also, the position estimating unit 410b may change the rotor position information 'angle' according to the received lead angle LA.

The sinusoidal wave generating unit 420b may receive the rotor position information 'angle' to generate the sinusoidal signals S_a, S_b, and S_c. The sinusoidal wave generating unit 420b may store, for example, a look-up table according to the rotor position information 'angle'. The sinusoidal generating unit 420b may generate the sinusoidal signals S_a, S_b, and S_c corresponding to the received rotor position information 'angle' according to the look-up table. For example, the sinusoidal signal S_a may be generated as a reference signal according to the rotor position information 'angle'. The sinusoidal signal S_b may be generated as a signal having a phase difference of 120° from the sinusoidal signal S_a. The sinusoidal signal S_c may be generated as a signal having a phase difference of 240° from the sinusoidal signal S_a.

A pulse width modulating unit 440b may receive the sinusoidal signals S_a, S_b, and S_c to generate the pulse width modulation signals U_pwm, V_pwm, and W_pwm. The pulse width modulating unit 440b may perform the pulse width modulation (PWM) to generate the pulse width modulation signals U_pwm, V_pwm, and W_pwm corresponding to the received sinusoidal signals S_a, S_b, and S_c.

Furthermore, the pulse width modulating unit 440b may receive a speed control signal v_con from the speed estimation and control unit 430b. The pulse width modulating unit 440b may control pulse widths of the pulse width modulation signals U_pwm, V_pwm, and W_pwm according to the voltage control signal v_con. For example, when the pulse widths of the pulse width modulation signals U_pwm, V_pwm, and W_pwm increase, the rotor speed of the motor 600 may be increased.

The speed estimation and control unit 430b may receive the rotor position information 'angle' to generate the rotor speed. The rotor speed may be estimated through a change of the rotor position information 'angle' according to time. The speed estimation and control unit 430b may receive a reference speed signal v_ref. The speed estimation and control unit 430b may compare the estimated rotor speed value with the reference speed signal v_ref to generate a speed control signal. For example, the estimated rotor speed is faster than the reference speed, the speed estimation and control unit 430b may generate a speed control signal v_con to decrease the rotor speed. When the estimated rotor speed is slower than the reference speed, the speed estimation and control unit 430b may generate the speed control signal v_con to increase the rotor speed.

As described above, the minimum power consumption estimating unit 450b may transmit the lead angle LA to the position estimating unit 410b. The position estimating unit 410b may change the estimated rotor position information 'angle' according to the received lead angle LA. The pulse width modulation signals U_pwm, V_pwm, and W_pwm may be generated according to the changed rotor position information 'angle'. When the pulse width modulation signals U_pwm, V_pwm, and W_pwm are changed, the rotor position may be changed. That is, the rotor position may be changed according to the lead angle LA. Accordingly, the minimum power consumption estimating unit 450*b* may change the lead angle LA to control the power consumption of the motor 600. However, the rotor speed of the motor may not be changed. This is because, as described in relation to FIG. 3, the lead angle LA does not change a slope of the rotor position information 'angle'. That is, the motor may be driven with the link current $i_{link}$ lower than an initially provided current under the same conditions.

According to the embodiments of the present invention, a driving circuit of a motor, which estimates minimum power consumption of the motor by measuring a dc current provided to the driving circuit, and a driving method thereof can be provided.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A motor driving circuit which transmits a driving signal to a motor having Hall sensors mounted therein, the motor driving circuit comprising:
   a gate driver generating the driving signal corresponding to a pulse width modulation signal;
   a pulse width modulation signal generator generating the pulse width modulation signal according to Hall sensor signals received from the Hall sensors;
   a current sensor generating a sensor current by measuring a link current provided to the gate driver;
   a low pass filter generating a filter current by removing high frequency components from the sensor current; and
   a minimum power consumption estimating unit generating a lead angle according to a start signal and the filter current, the filter current being incrementally adjusted in response to an increase or decrease in the lead angle;
   wherein
      the pulse width modulating signal is changed according to the lead angle, and
      the minimum power consumption estimating unit generates the lead angle by comparing at least two filter currents, corresponding to link currents, provided at different points.

2. The motor driving circuit of claim 1, wherein the pulse width modulation signal generator comprises:
   a position estimating unit generating rotor position information according to the Hall sensor signals;
   a sinusoidal wave generating unit generating a sinusoidal signal according to the rotor position information; and
   a pulse width modulating unit generating the pulse width modulation signal according to the sinusoidal signal.

3. The motor driving circuit of claim 2, wherein the pulse width modulation signal generator comprises:
   a speed estimation and control unit
      estimating a rotor speed according to the rotor position information,
      receiving a reference speed signal to compare the estimated rotor speed with the reference speed signal, and
      generating a speed control signal according to a comparison result,
   wherein the pulse width modulating unit changes the pulse width modulating signal according to the speed control signal.

4. The motor driving circuit of claim 2, wherein the position estimating unit changes the rotor position information according to the lead angle.

5. The motor driving circuit of claim 1, wherein, when the start signal is logic 0, the minimum power consumption estimating unit outputs a pre-stored lead angle.

6. The motor driving circuit of claim 1, wherein, when the start signal is logic 1, the minimum power consumption estimating unit changes the lead angle according to a preset lead angle change amount.

7. The motor driving circuit of claim 6, wherein, when the filter current decreases according to the increase in the lead angle, the minimum power consumption estimating unit increases the lead angle by the lead angle change amount and outputs the increased lead angle.

8. The motor driving circuit of claim 6, wherein, when the filter current increases according to the increase in the lead angle, the minimum power consumption estimating unit decreases the lead angle by the lead angle change amount and outputs the decreased lead angle.

9. The motor driving circuit of claim 6, wherein, when the filter current decreases according to the decrease in the lead angle, the minimum power consumption estimating unit decreases the lead angle by the lead angle change amount and outputs the decreased lead angle.

10. The motor driving circuit of claim 6, wherein, when the filter current increases according to the decrease in the lead angle, the minimum power consumption estimating unit increases the lead angle by the lead angle change amount and outputs the increased lead angle.

11. The motor driving circuit of claim 1, wherein the driving signal is generated by using the pulse width modulation signal and the link current.

12. A method of operating a motor driving circuit, comprising:
   measuring a link current provided to a gate driver;
   removing high frequency components from the link current and converting the high frequency components-removed link current into a filter current;
   generating a lead angle through a minimum power consumption estimating process according to the filter current and a start signal, the filter current being incrementally adjusted in response to an increase or decrease in the lead angle;
   generating a pulse width modulation signal according to the lead angle; and
   generating, by the gate driver, a motor driving signal according to the pulse width modulation signal,
   wherein the lead angle is generated by comparing at least two filter currents, corresponding to link currents, provided at different points.

13. The method of claim 12, wherein the generating of the lead angle comprises:
   receiving a first filter current corresponding to a first lead angle;
   receiving a second filter current corresponding to a second lead angle which is changed from the first lead angle; and
   outputting the first or second lead angle according to a difference between the first and second filter current values.

14. The method of claim 13, wherein, in the outputting of the first or second lead angle, the second lead angle is output in a case where a value obtained by subtracting the first filter current value from the second filter current value is smaller than a preset reference current value.

15. The method of claim 13, wherein, in the outputting of the first or second lead angle, the first lead angle is output in a case where a value obtained by subtracting the first filter current value from the second filter current value is greater than or equal to a preset reference current value.

16. The method of claim 12, wherein the generating of the motor driving signal comprises:
generating, by the gate driver, the motor driving signal by using the pulse width modulation signal and the link current.

17. The method of claim 12, wherein the filter current is incrementally decreased in response to the increase or decrease in the lead angle.

18. A motor driving circuit which transmits a driving signal to a motor having Hall sensors mounted therein, the motor driving circuit comprising:
a gate driver configured to generate a driving signal corresponding to a pulse width modulation signal;
a pulse width modulation signal generator configured to generate the pulse width modulation signal according to Hall sensor signals received from the Hall sensors;
a current sensor configured to generate a sensor current by measuring a link current provided to the gate driver;
a low pass filter configured to generate a filter current by removing high frequency components of the sensor current; and
a minimum power consumption estimating unit configured to
generate a lead angle according to a start signal and the filter current,
store a first filter current value corresponding to a first lead angle, and
receive a second filter current corresponding to a second lead angle, which is changed from the first lead angle, to output the first or second lead angle according to a difference between the first filter current value and a second filter current value,
wherein the pulse width modulating signal is changed according to the lead angle.

19. The motor driving circuit of claim 18, wherein, when a value obtained by subtracting the first filter current value from the second filter current value is smaller than a reference current value, the minimum power consumption estimating unit outputs the second lead angle.

20. The motor driving circuit of claim 18, wherein, when a value obtained by subtracting the first filter current value from the second filter current value is greater than or equal to a reference current value, the minimum power consumption estimating unit outputs the first lead angle.

* * * * *